United States Patent [19]

Stephan

[11] Patent Number: 5,141,103

[45] Date of Patent: Aug. 25, 1992

[54] STORAGE CONTAINER FOR RECORDING MEDIA, WITH SLIDER MEMBER LOCKING MECHANISM

[75] Inventor: Christoph Stephan, Waldachtal, Fed. Rep. of Germany

[73] Assignee: fischerwerke Artur Fischer GmbH & Co. KG, Waldachtal, Fed. Rep. of Germany

[21] Appl. No.: 619,310

[22] Filed: Nov. 28, 1990

[30] Foreign Application Priority Data

Dec. 23, 1989 [DE] Fed. Rep. of Germany ....... 3942845

[51] Int. Cl.⁵ .............................................. A45C 13/10
[52] U.S. Cl. .................................... 206/1.5; 206/309; 206/387; 206/444
[58] Field of Search ............... 206/309, 387, 444, 1.5; 312/12, 323; 292/85, 87

[56] References Cited

U.S. PATENT DOCUMENTS

| | | | |
|---|---|---|---|
| 4,436,201 | 3/1984 | Inaba | 206/444 |
| 4,738,361 | 4/1988 | Ackeret | 206/307 |
| 4,760,502 | 7/1988 | Ackeret | 362/86 |
| 4,828,341 | 5/1989 | Bohnet et al. | 312/12 |

FOREIGN PATENT DOCUMENTS 59-5466  1/1984  Japan .................... 206/309

Primary Examiner—Paul T. Sewell
Assistant Examiner—Thomas P. Hilliard
Attorney, Agent, or Firm—Michael J. Striker

[57] ABSTRACT

A storage container for recording media such as magnetic tape cassettes, compact discs and the like comprises a housing and a slider member displaceable in the housing between storage and removal positions. A locking arrangement is provided for locking the slider member in the housing in the storage position of the slider member. The locking arrangement includes a resilient flexible bar and a latch formed at one of opposite ends of the resilient locking bar with another of the opposite ends being secured to the slider member. A side arm projects from the resilient flexible bar and engages with the slider member for displaceably supporting the latch on the slide member. The arrangement includes a press button which is supported on the front portion of the slide member and is pressed against the resilient flexible bar to provide for movement of the latch from its locking position to its unlocking position.

4 Claims, 3 Drawing Sheets

STORAGE CONTAINER FOR RECORDING MEDIA, WITH SLIDER MEMBER LOCKING MECHANISM

BACKGROUND OF THE INVENTION

The invention relate to a storage container for magnetic tape cassettes, which has a slider member insertable against a spring force into the storage container housing, and a locking arrangement for locking the slider member in the housing with a latch.

Containers for recording media, such as tape recording cassettes, compact discs and similar media in which one or more slider members are arranged in a container housing that is open on one side, are known. Each slider member is able to hold one of these recording media and is inserted into the housing against a spring force. By a catch element, the slider member is kept in its inserted position with its front panel being flush with the housing opening. By operating an unlocking button, the slider member is moved by the spring into a removal position thereof.

In the known containers, it is often necessary to operate the unlocking button several times in order to effect unlocking. Also when inserting the slider member into the housing, the catch element frequently does not lock immediately in a corresponding housing recess. Relatively wide fluctuations in temperature in particular can have an adverse effect on the plastic parts. At relatively high temperatures, the locking arrangements of the known containers are frequently not dimensionally stable. External interfering influences, such as sand, sticky liquids, etc. impair functioning of the locking arrangement.

SUMMARY OF THE INVENTION

The object of the invention is a simple locking arrangement that is inexpensive to manufacture, for a storage container described above.

The object of the invention is achieved by providing a spring element having a form of a flexible bar at one end of which a latch is formed, and the other end of which is fixed to the slider member, the latch being displaceably mounted by using a side arm projecting from the bar.

The spring element connected to the button is mounted so that it is resiliently rotatable. Therefore, the spring element flexes as the button is operated. The spring element is fixed at two points so that when pressure is exerted on the button the latch is moved out of the housing to the lateral boundary of the slider member. The slider member becomes thereby unlocked, and is pushed by the spring force into the removal position thereof. The insertion of the slider member into the housing of the storage container can be effected without difficulty despite the latch being located on the locking arrangement since the sloping face on the latch, as it is introduced into the housing, brings the latch into a position in which it closes flush with the lateral boundary of the slider member. Once the slider member has reached its end position in the housing of the storage container, the latch snaps into the opening opposite it in the side wall of the housing of the storage container and, thus, locks the slider member in the storage container.

As there are no friction or contact faces on the locking arrangement, there is no wear of the locking arrangement even as a consequence of frequent operation of the button.

During the unlocking operation, conversion of the pressure exerted on the button into an unlocking movement at right angles thereto is achieved by flexion of the spring element. As it does so, the latch is able to slide out of the housing opening of the storage container. It is possible for the latch to close flush with the lateral boundary of the slider member because the end of the flexible bar opposite the latch is fixed to the slider member in a rotatably resilient manner. In the region of the latch, a side arm projects from the flexible bar which arm is fixed at a bearing lug to the slider member. By fixing the flexible bar at the two bearing lugs so that it is able to rotate, it is possible for the flexible bar to flex. The extension of the latch during the bending process describes a pivoting movement directed towards the lateral boundary of the slider member.

Transfer of the force exerted on the button to the flexible bar is made possible by using an arm for joining the button to the flexible bar. This arm comes up against the angle of an obtusely angled member molded on the flexible bar whereby the course of the flexing operation is predetermined.

The locking arrangement can be provided in such a manner that the button forms one element with the flexible bar, the flexible bar being injection molded integrally with the slider member in the region where the bearing lugs are formed, in the other embodiments. This permits to avoid any additional effort during mounting. The resiliency during the bending operation is made possible by arranging on the arm located between the button and the flexible bar, a portion of reduced diameter which thus provides a further opportunity for resilient bending.

An advantageous development of the invention provides for the arm arranged on the button to engage in a button location seat formed on the flexible bar. The button and flexible bar thus consist of two parts, providing the opportunity for the button to be shaped independently of the spring element. This too facilitates exchangeability of the parts, since they can be replaced independently of one another.

Likewise, the bearing lugs provided on the flexible bar can also be constructed in the form of bearing journals, which lie rotatably on pivot bearings provided on the slider member.

The locking arrangement can therefore be constructed in several variations which may also be combined with one another.

The present invention both as to its construction so to its mode of operation, together with additional objects and advantages thereof, will be best understood from the following detailed description of the preferred embodiments when read with reference to the accompanying drawings.

DETAILED DESCRIPTION OF THE PREFERRED EMBODIMENTS

Figure 1:
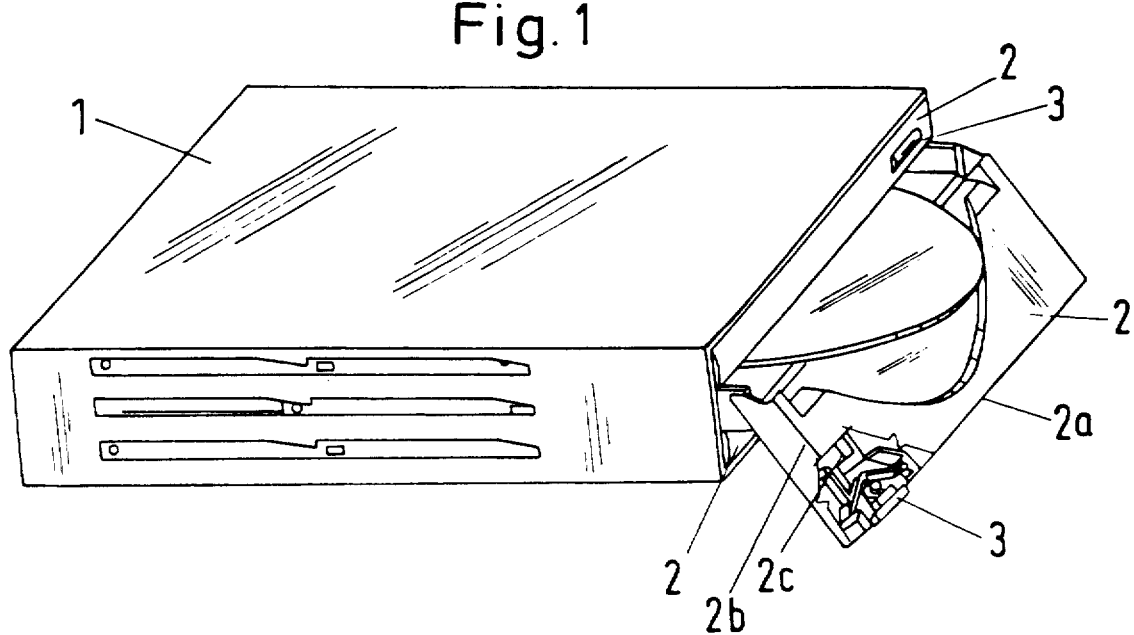
FIG. 1 shows, in a perspective view of a storage container for recording media with a slider member located in the removal position, according to the invention.

FIG. 1 shows a housing 1 of a storage container for recording media such as magnetic tape cassettes, gramophone records, compact discs or similar media, which housing accommodates several slider members 2, of which the middle slider member 2 is in the recording media removal position. In this position, the front portion of the slider member 2 folds downwards and, thus, facilitates removal of a cassette or similar article located therein. The removal position is reached by unlocking the slider member 2 by a button 3 on the housing 1 of the storage container. The part of the locking arrangement positioned at the rear of a panel 2a is arranged between upper and lower cover faces 2b and 2c. After being unlocked, the slider member 2 is pushed out of the housing 1 by a spring, not shown in the drawings, located in the rear region of the housing 1 of the storage container, and is brought into the removal position.

Figure 2:
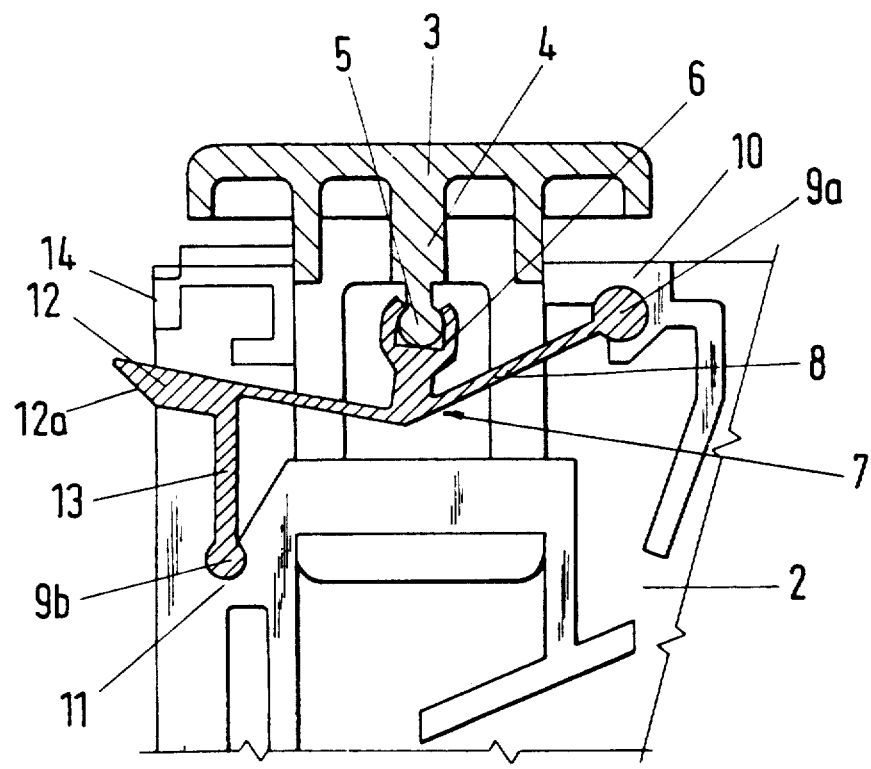
FIG. 2 shows a top partial cross-sectional view of the locking arrangement according to the invention.

FIG. 2 shows an enlarged view of a portion of the locking arrangement shown in FIG. 1 in the region of the button 3. In the middle region, the button 3 has an arm 4 having a circular lug 5 located in the button locating seat 6 of the spring element 7. The spring element 7 comprises a flexible bar 8 having two bearing lugs 9a, 9b displaceable in pivot bearings 10 and 11 arranged on the slider member 2. The end of the flexible bar 8 opposite the bearing lug 9a is formed as a latch 12 with a sloping face 12a. In the region of the latch 12, a side arm 13 projects from the flexible bar. At its free end, the side arm 13 carries the bearing lug 9b.

Upon actuation of the button, which initiates unlocking of the slider member 2, the movement of the button is translated into the direction at right angles thereto into the movement executed by the latch 12 as follows:

Upon actuation of the button 3, the pressure acting thereon is transferred by the arm 4 and the lug 5 to the button locating seat 6 and thus to the flexible bar 8. The two arms of the flexible bar 8 are, in relation to the drawing, moved downwards, whereby a flexing of the flexible bar 8 takes place. The flexing is facilitated by the movably mounted bearing lugs 9a, 9b. As the flexible bar 8 flexes, the side arm 13 located in the region of the latch describes an inwardly directed pivoting movement, whereby the latch 12 is brought into a position in which it lies flush with the lateral boundary 14 of the slider member 2. The latch 12 thereby permits the ejection movement required for the slider member to reach the removal position. In the locking position, ejection was prevented by the latch 12 engaging in an opening of the housing 1 shown in FIG. 1, and thus locking the slider member 2 in the housing 1. When the button 3 is returned to its non-operating position, the latch 12 is finally again moved outwards, and brought into its rest position.

If the slider member 2 is now inserted back into the housing 1 of the storage container, the sloping face 12a arranged on the latch 12 makes possible a return of the latch 12 initiated by the wall region of the housing opening of the housing 1, to the lateral boundary 14 of the slider member 2. As soon as the slider member 2 has been brought into its end position in the housing 1, the latch 12 again slides into the opening located on the housing 1 and thus locks the slider member 2 in the housing 1 of the storage container.

Figure 3:
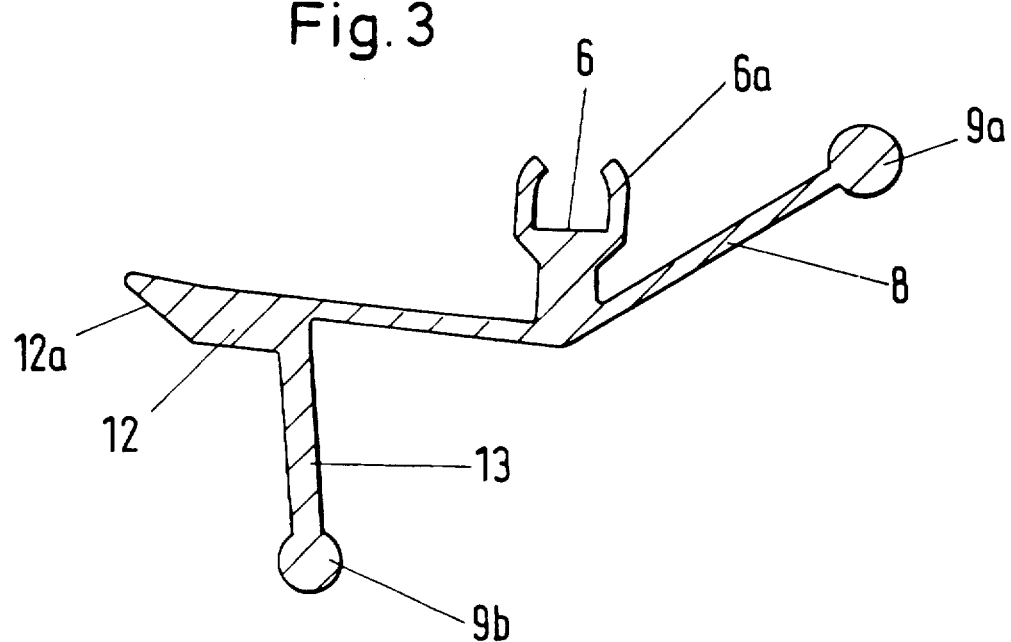
FIG. 3 shows a cross-sectional view of the flexible bar visible in FIG. 2.

The detail view shown in FIG. 3 of the spring element 7 already apparent from FIG. 2 shows the flexible bar 8 with bearing lugs 9a, 9b located thereon. In the embodiment according to the invention, the lugs consist of bearing trunnions which engage in corresponding recesses of the pivot bearings 10 and 11 apparent from FIG. 2. The side arm 13 branching off the flexible bar 8 in the area of the latch 12 provides for the resilient mobility of the latch 12 and causes positioning of the latch in unlocking or locking positions. If a pressure is exerted by the button on the locating seat 6, which is provided with claws 6a, of the flexible bar 8, the flexible bar is flexed, the side arm 13 pivots outwardly relative to the seat 6, and the latch 12 moves upwards. As soon as the sloping face 12a closes flush with the lateral boundary 14 of the slider member 2, the locking arrangement is in the unlocking position, which allows the slider member 2 to be ejected. When the pressure is removed, because the flexible bar 8 is relieved of pressure, and also because of the outwardly directed pivoting movement of the side arm, the latch 12 pivots outwards and is located in its rest position.

Figure 4:
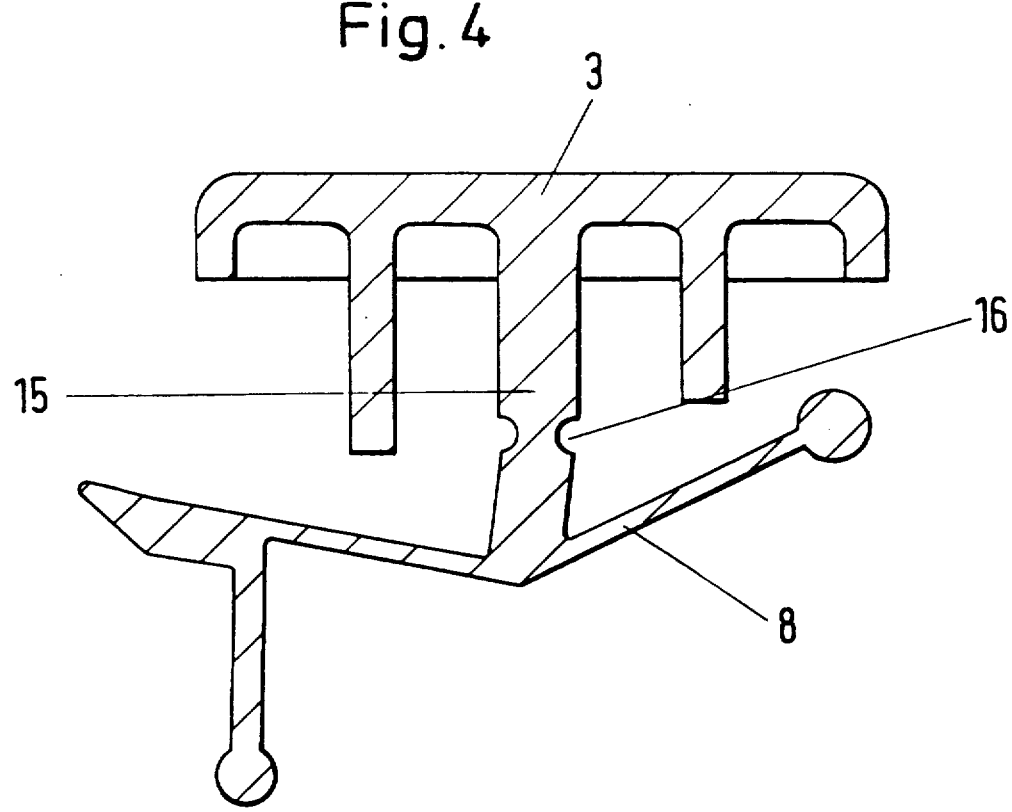
FIG. 4 shows a cross-sectional view of another embodiment of the locking arrangement according to the invention with a continuous arm.

In the embodiment of the locking arrangement according to the invention shown in FIG. 4, the button 3 which is connected by a continuous arm 15 to the flexible bar 8. The arm 15 has a portion of reduced diameter 16 which provides for resilient bending process during unlocking of the slider member.

Figure 5:
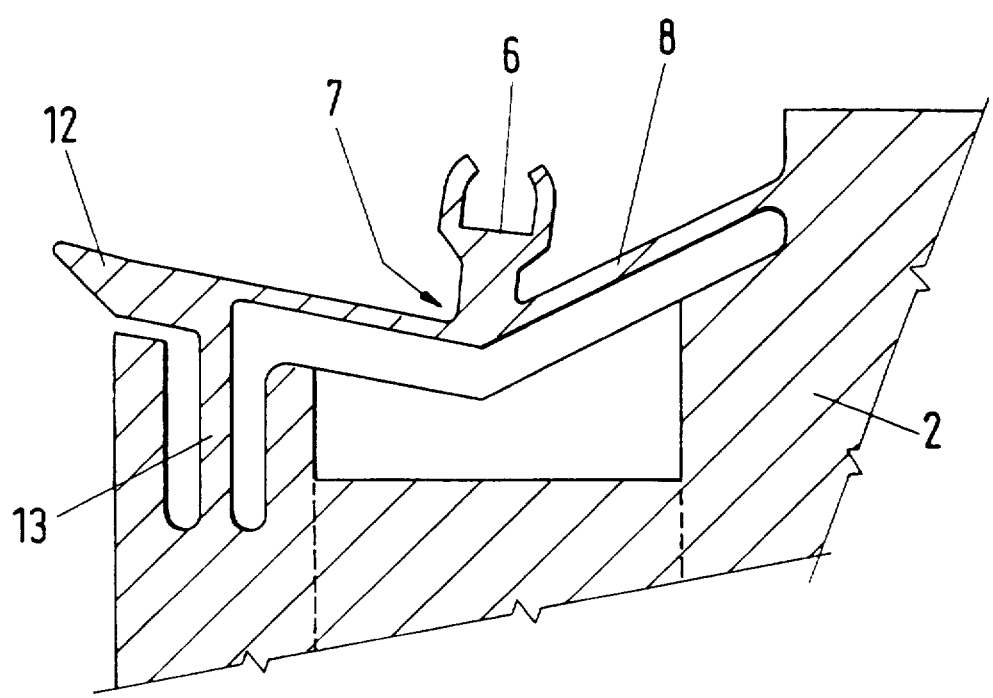
FIG. 5 shows a cross-sectional view of yet another embodiment of the locking arrangement according to the invention in a form in which it is injection-molded on the slider member.

FIG. 5 shows an embodiment of the locking arrangement according to the invention in which the spring element 7 is injection molded integrally with the body of the slider member 2. Since in this embodiment also the flexible bar 8 and the side arm 13 are of resilient construction, pressure exerted on the button locating seat 6 of the spring element 7 causes the spring element 8 to flex bringing the latch into its unlocking position.

While the invention has been illustrated and described as embodied in a storage container for recording media, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A storage container for recording media, comprising a housing; a slider member displaceable in said housing between storage and removal positions and having a front portion; and means for locking said slider member in said housing in the storage position of said slider member, said locking means including a resilient flexible bar having opposite ends, a latch formed at one of said opposite ends, a bearing lug formed at another of said opposite ends of said flexible bar, said slider member having a pivot bearing in which said bearing lug is engagable; a side arm projecting from said flexible bar and having another bearing lug formed on an end of said side arm remote from said flexible bar, said slider member having another pivot bearing in which said other bearing lug is engaged; and a press button supported on said front portion of said slider member, engagable with said flexible bar and actuable to provide for movement of said latch from a locking position of said latch to an unlocking position.

2. A storage container as set forth in claim 1, wherein said locking means also includes a connection arm connected to said press button, said connection arm being engagable with said resilient flexible bar to produce said movement and said resilient flexible bar describes an obtuse angle having an apex in the vicinity of said connected arm.

3. A storage container as set forth in claim 2, wherein said resilient flexible bar has a button locating seat for receiving an end of said connection arm, said end of said connection arm having a lug formed to engage in said button locating seat.

4. A storage container as set forth in claim 3, wherein said button locating seat is provided with opposing claws extending toward said connection arm and engaging said lug of said connection arm.

* * * * *